(12) United States Patent
Vanwambeke et al.

(10) Patent No.: US 9,434,347 B2
(45) Date of Patent: Sep. 6, 2016

(54) LOW NOISE, DEBRIS TOLERANT RETRACTOR INERTIAL SENSOR

(71) Applicant: Autoliv ASP, Inc., Ogden, UT (US)

(72) Inventors: Bryan M. Vanwambeke, Macomb, MI (US); James S. Bourn, Oxford, MI (US); Megan E. Mahorney, Flint, MI (US); David Prentkowski, Sterling Heights, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 421 days.

(21) Appl. No.: 13/709,855

(22) Filed: Dec. 10, 2012

(65) Prior Publication Data

US 2014/0158807 A1 Jun. 12, 2014

(51) Int. Cl.
*B60R 22/40* (2006.01)

(52) U.S. Cl.
CPC ..................................... *B60R 22/40* (2013.01)

(58) Field of Classification Search
USPC ................. 297/474–480; 242/384, 384.6
See application file for complete search history.

(56) References Cited

U.S. PATENT DOCUMENTS

| | | |
|---|---|---|
| 3,758,044 A | 9/1973 | Nilsson |
| 3,901,459 A | 8/1975 | Romanzi et al. |
| 3,911,391 A | 10/1975 | Held et al. |
| 3,981,518 A | 9/1976 | Pulling |
| 4,097,699 A | 6/1978 | Larson |
| 4,262,858 A | 4/1981 | Takada |
| 4,314,680 A | 2/1982 | Takada |
| 4,329,549 A | 5/1982 | Breed |
| 4,382,564 A | 5/1983 | James |
| 4,410,875 A | 10/1983 | Spies et al. |
| 4,458,920 A | 7/1984 | Ozaki |
| 4,484,041 A | 11/1984 | Andres et al. |
| 4,608,501 A | 8/1986 | Andres et al. |
| 4,638,179 A | 1/1987 | Mattes et al. |
| 4,639,563 A | 1/1987 | Gunther |
| 4,827,091 A | 5/1989 | Behr |
| 4,844,374 A | 7/1989 | Mori |
| 4,879,906 A | 11/1989 | Meline et al. |
| 4,889,068 A | 12/1989 | Tabata et al. |
| 4,915,411 A | 4/1990 | Norton |
| 4,936,601 A | 6/1990 | Tada |
| 4,955,638 A | 9/1990 | Kinoshita et al. |
| 4,985,835 A | 1/1991 | Sterler et al. |
| 5,005,861 A | 4/1991 | Breed et al. |
| 5,011,182 A | 4/1991 | Husby et al. |
| 5,100,169 A | 3/1992 | Goor et al. |

(Continued)

FOREIGN PATENT DOCUMENTS

| | | |
|---|---|---|
| CA | 1160604 | 1/1984 |
| DE | 298 22 610 | 5/1999 |

(Continued)

*Primary Examiner* — Sang Kim
(74) *Attorney, Agent, or Firm* — Brinks Gilson & Lione

(57) ABSTRACT

A seatbelt retractor inertial locking system for motor vehicle belt restraint systems. The inertial locking system incorporates features to reduce the influence of contaminants from causing unwanted locking of the associated retractor. The feature is in part provided by the positioning of a point contact between a ball mass and a locking lever. The inertia actuator forms the inertial ball mass nest surface which has a vented construction which permits the escape of contaminants and further contributes to reducing noise generated by contact between the ball mass and the nest surface.

5 Claims, 3 Drawing Sheets

(56) References Cited

U.S. PATENT DOCUMENTS

| | | | |
|---|---|---|---|
| 5,177,370 A | 1/1993 | Meister | |
| 5,184,844 A | 2/1993 | Goor | |
| 5,251,843 A * | 10/1993 | Kielwein et al. | 242/384.6 |
| 5,261,506 A | 11/1993 | Jost | |
| 5,271,639 A | 12/1993 | Nishizawa | |
| 5,375,908 A | 12/1994 | Goor | |
| 5,388,464 A | 2/1995 | Maddison | |
| 5,390,874 A | 2/1995 | Lane, Jr. | |
| 5,390,952 A | 2/1995 | Goor | |
| 5,430,334 A | 7/1995 | Meister | |
| 5,449,198 A | 9/1995 | Jeenicke et al. | |
| 5,485,041 A | 1/1996 | Meister | |
| 5,526,996 A | 6/1996 | Ebner et al. | |
| 5,562,259 A | 10/1996 | Kielwein | |
| 5,562,269 A | 10/1996 | Protz, Jr. | |
| 5,620,203 A | 4/1997 | Jeenicke et al. | |
| 5,622,327 A | 4/1997 | Heath et al. | |
| 5,622,383 A | 4/1997 | Kielwein et al. | |
| 5,636,807 A | 6/1997 | Warrick | |
| 5,687,926 A | 11/1997 | Park et al. | |
| 5,706,181 A | 1/1998 | Dirmeyer et al. | |
| 5,848,758 A | 12/1998 | Ernst | |
| 5,882,084 A | 3/1999 | Verellen et al. | |
| 5,895,071 A | 4/1999 | Norton | |
| 6,139,053 A | 10/2000 | Knox | |
| 6,299,093 B1 | 10/2001 | Harte et al. | |
| 6,386,472 B1 | 5/2002 | Rogers, Jr. | |
| 6,435,442 B1 | 8/2002 | Kielwein et al. | |
| 6,547,175 B2 | 4/2003 | Kielwein et al. | |
| 6,647,788 B2 | 11/2003 | Murai et al. | |
| 6,802,470 B2 | 10/2004 | Smithson et al. | |
| 7,013,736 B2 | 3/2006 | Knox | |
| 2006/0144984 A1 * | 7/2006 | Daeuber et al. | 242/384.6 |
| 2010/0140386 A1 | 6/2010 | Lee | |

FOREIGN PATENT DOCUMENTS

| | | |
|---|---|---|
| DE | 103 13 326 A1 | 10/2004 |
| EP | 0 761 513 | 5/2000 |
| GB | 2 157 045 | 10/1985 |

\* cited by examiner

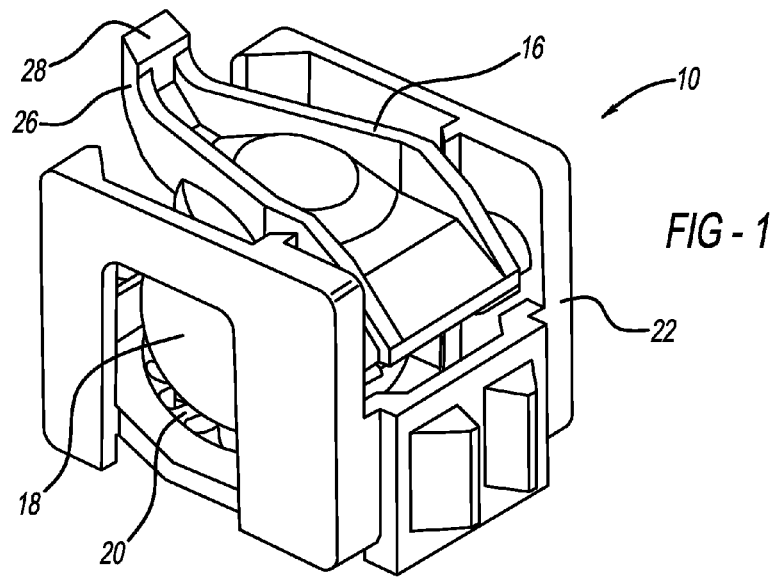
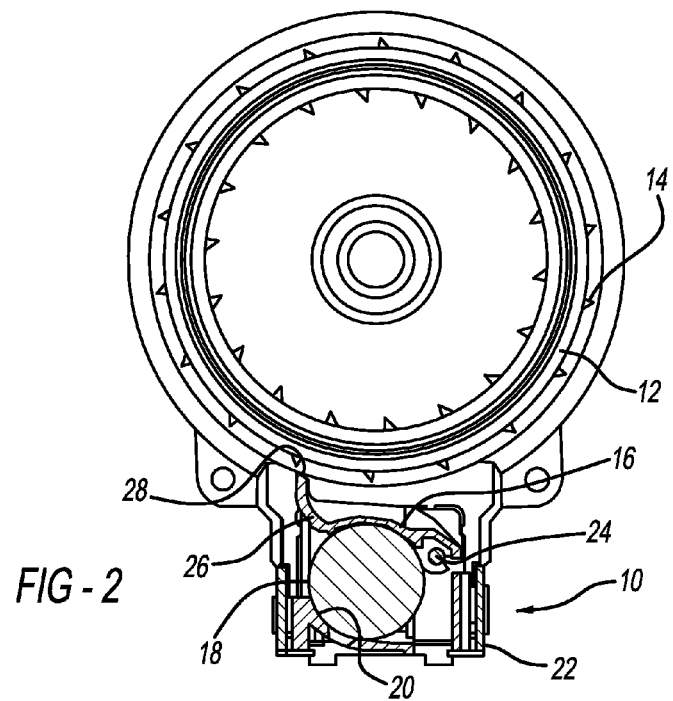

LOW NOISE, DEBRIS TOLERANT RETRACTOR INERTIAL SENSOR

FIELD OF THE INVENTION

This invention relates to an automotive occupant restraint seat belt retractor, and particularly to an inertial sensor of a vehicle sensitive control system for such a retractor.

BACKGROUND OF THE INVENTION

Motor vehicles are frequently equipped with active occupant restraint systems such as seat belt assemblies. Seat belt assemblies typically have lap and shoulder belt portions for restraining the occupant in the event of an impact or rollover event. To enhance the comfort and convenience provided by the seat belt system and to provide other functions, retractors are provided which allow the belt webbing to be freely paid-out and retracted when the vehicle is not subjected to unusual acceleration forces or inclination. In the event of exposure to such forces, a retractor control system activates to lock the retractor to prevent additional pay-out (extraction or protraction) of webbing. Thus, the retractor locks in a manner to enable the seat belt webbing to restrain the occupant. Such retractor control systems take various forms. One category of such control systems is known as vehicle sensitive inertial locking systems. These systems are sensitive to acceleration forces acting on the vehicle resulting from a frontal impact, side impact, rollover, and when certain other forces act on the vehicle.

Another category of such retractor control systems is known as belt sensitive control systems. These devices operate much in the manner of a centrifugal clutch and sense the rotational speed of the retractor spool, such that when high angular accelerations of the retractor spool occurs associated with rapid extraction of webbing, the control system engages to lock the retractor. This invention is related to an improved vehicle sensitive retractor inertial locking sensor.

As mentioned previously, vehicle sensitive retractor inertial locking sensors must respond to acceleration loads acting in various axes and planes. Primarily important are impacts to the vehicle creating acceleration loads acting in the horizontal plane, such as front, rear, or side impact conditions. However, if a rollover event has occurred, it is important that the retractor lock to restrain the occupant. Typical inertial retractor locking sensors utilize a pendulum, standing man, or rolling ball type inertial mass to activate a locking lever which engages directly or indirectly with a ratchet wheel of the retractor webbing spool which acts as a spool lock. In response to accelerations of the vehicle, the inertial mass moves to urge the locking lever to engage with the ratchet wheel, thus locking the spool from allowing further extraction of webbing. These devices have been utilized for many decades and have proven to be reliable and effective retractor control systems.

In the operating environment of a passenger car, interior components are subjected to exposure to foreign material such as liquids, dirt, and particles associated with normal or expected use of the vehicle by its occupants. The presence of foreign objects infiltrating into a seat belt retractor mechanism can interfere with operation of an inertia sensitive sensor. Traditional inertial sensors using a rolling ball or standing man type inertial mass can operate improperly in the event that debris remains in contact with the inertial mass or the related components which can interfere with desired lock-up operation of the system. For example, in the case of a rolling ball type mass, foreign particles collecting on the ball mass can become interposed between the ball mass and the associated ball seat, or between the ball mass and the associated actuating lever which senses movement of the ball. The presence of such contaminants can interfere with the designed system tolerances and interaction between actuation components. Moreover, due to the typical manner of providing a sensing lever acted on by a ball mass, very small sized contaminants can produce significant movement of the lever which can lead to inadvertent lock-up behavior. The precision requirements of present designs impose manufacturing cost penalties and capacity constraints.

In one prior art design of a ball mass type inertial sensor, the actuation lever forms a ring which contacts the ball mass along a ring contact line on an upper surface of the ball. As soon as the ball mass starts to move in any direction, the lever begins to lift due to contact with the ring feature. Even normal lever-to-housing parts tolerance variations may cause the lever to begin to lift (from a desired nominal position) and reduce the gap with the associated ratchet wheel, perhaps leading to inducing lockup when the system is not affected by movement/acceleration. This condition leads to an unintentionally sensitive retractor assembly.

Another important consideration in the design and manufacture of automotive components is their tendency to contribute to unwanted noise during vehicle operation referred to generally as buzz, squeak, and rattle (BSR). Existing vehicle sensitive inertia sensors have tendencies to create undesirable noise as the inertial mass moves within its seat and against the associated locking lever and other components.

In view of the above, there is a desire in the design of retractor inertial actuators to improve their tolerance to contaminants and further to provide means for eliminating contaminants which can lead to the above-described improper operation. In addition, there is a need to provide retractor inertial actuators which reduce BSR problems.

SUMMARY OF THE INVENTION

In satisfying the above need, as well as overcoming the enumerated drawbacks and other limitations of the related art, the present invention provides a vehicle sensitive retractor inertial locking sensor having a point of interaction between a spherical ball mass and its associated actuating lever which is spaced some distance from the axis of pivoting motion of the actuating lever, as compared with conventional designs. This point contact results in a reduced angular deflection of the actuating lever caused by the presence of a given size of contaminant particle at the contact area between the ball mass and the actuating lever as compared with prior art designs. The inertial locking system of this invention further provides an inertial ball seat design featuring a vented construction which aids in allowing contaminants to fall away from the actuator, and further provides a damping function to reduce noise resulting from vibration of the inertial ball mass.

Additional benefits and advantages of the present invention will become apparent to those skilled in the art to which the present invention relates from the subsequent description of the preferred embodiment and the appended claims, taken in conjunction with the accompanying drawings.

BRIEF DESCRIPTION OF THE DRAWINGS

FIG. 1 is a pictorial view of a seat belt retractor inertial locking actuator in accordance with the present invention;

FIG. 2 is a side sectional view of the seat belt retractor locking actuator as illustrated in FIG. 1 shows further shown with components of a retractor spool;

DETAILED DESCRIPTION OF THE INVENTION

Figure 3:
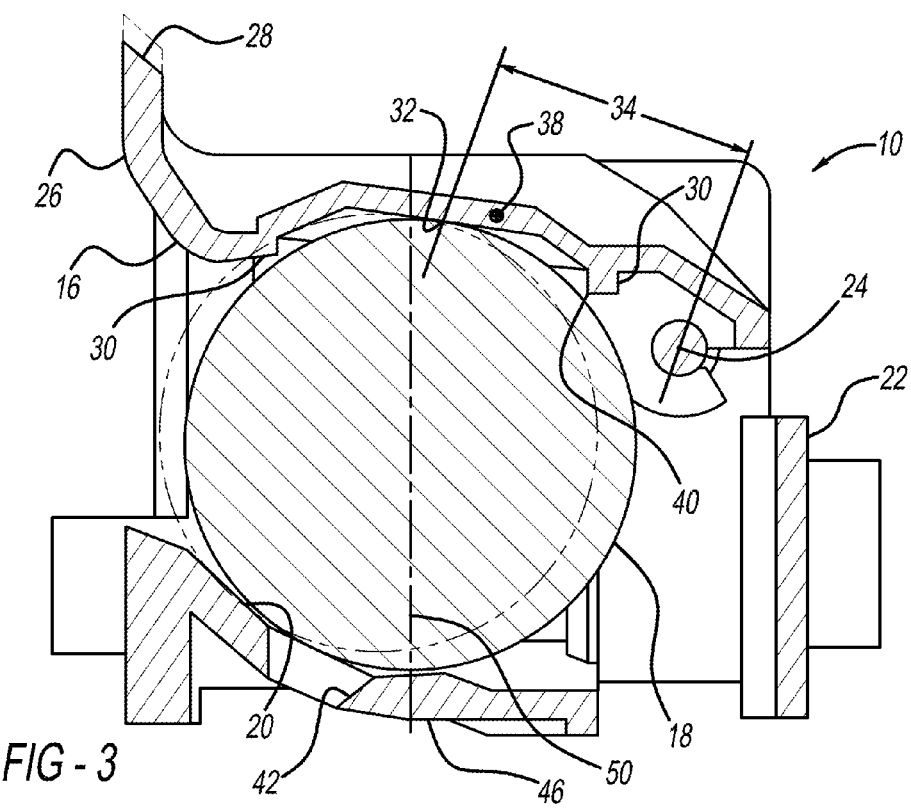
FIG. 3 is an enlarged cross-sectional view of the actuator shown in FIG. 2.

A seat belt retractor inertial locking sensor in accordance with the present invention is illustrated in FIGS. 1 and 2 and is generally designated by reference number 10. Locking sensor 10 operates in conjunction with a ratchet wheel 12 which is part of a seat belt retractor (not shown in its entirety) having a rotating webbing spool. Ratchet wheel 12 includes an array of ramped teeth 14 around its perimeter. Teeth 14 are used to enable locking sensor 10 to lock the webbing retractor spool, restricting extraction of seat belt webbing under specific operating conditions. Locking sensor 10 primarily incorporates locking lever 16, ball mass 18, and housing 22 forming ball nest 20.

It should be recognized that various approaches for providing a spool lock of a retractor locking system are known. Due to the extremely high forces involved in the locking operation of a retractor in restraining impact loads acting on seat belt webbing, ratchet wheel 12 may act as an intermediate locking device for the associated retractor. Locking lever 16 may force a pivoting locking bar (not shown) into engagement with spool ratchet wheel 12. In other words, the high torque loads acting on a retractor spool during occupant restraint may not, in some forms of the invention, be directly restrained by the interaction between arm edge 28 and ratchet wheel 12. Conventionally known mechanical servo-type spool lock engagement systems can be used for retractor inertial sensitive locking systems, such as that of the present invention. These systems allow the highly sensitive inertia locking sensor 10 to actuate other elements of a spool lock mechanism to lock the spool with sufficiently high strength to sustain restraint loads. These features are conventionally known and outside the scope of the novel features of the present invention.

Locking lever 16 is rotatably supported for pivoting motion about a shaft 23 which defines a pivot axis 24 (best shown in FIG. 3). Locking lever 16 includes arm 26 which forms edge 28 which engages with ratchet wheel teeth 14 under specific operating conditions, as briefly described above and explained in more detail in the following description. Lever 16 extends over the upper surface of ball mass 18 and includes a ring-shaped rim 30. Rim 30 is annular, encircling the upper surface of ball mass 18 but its surface is displaced from contact with the ball mass while it is in its normal position, like a halo. Accordingly, in the normal position of ball mass 18 there is clearance between the ball mass and rim 30. The center of gravity 38 (cg) of lever 16 is positioned relative to pivot axis 24 such that the locking lever is normally urged to rotate in the counterclockwise direction (when viewing the lever as in FIG. 3) such that the lever is urged downwardly into contact with ball mass 18.

As best shown in FIG. 3, locking lever 16 contacts ball mass 18 when it is in its normal resting position as shown in the figure at a point contact 32, which is positioned along or adjacent to the vertical diametric plane 50 of ball mass 18. Plane 50 is vertical with respect to gravity when sensor 10 is in its mounted position within the associated motor vehicle. This point contact 32 creates an actuating lever arm length 34 as shown in FIG. 3. For reasons which will be described in more detail as follows, the positioning of point contact 32 contributes to the debris tolerance capabilities of locking sensor 10.

Ball mass 18 rests on ball nest 20 which forms a generally concave surface on which the ball mass is cradled to remain in its normal position shown in FIG. 3. This positioning of the components is associated with the normal condition of the components of the locking sensor 10 in which inertial loads are not acting on the associated vehicle and retractor locking is not desired. In this position, the cg position 38 of locking lever 16 maintains it in the position shown in FIG. 3, in which arm edge 28 does not engage with ratchet wheel 12.

Operation of control sensor 10 in various conditions will now be described with reference to the Figures. As mentioned previously, FIG. 3 illustrates the orientation of the components in the normal condition in which inertial forces are not acting on the locking sensor 10 and locking of the associated retractor is not desired. In this condition, locking of the retractor does not occur since arm edge 28 does not engage with ratchet wheel 12 which acts as a spool lock. When inertial forces are acting on locking sensor 10 in a horizontal plane (corresponding to longitudinal or lateral inertial forces on the vehicle), ball mass 18 is urged to move from its normal position to a displaced actuation position. FIG. 3 shows an example of such displacement of ball mass 18 in phantom lines. In such an actuation, ball mass 18, through its contact with lever 16 at point contact 32, urges the locking lever to rotate clockwise about axis 24 to a position in which edge 28 engages with ratchet wheel 12, causing the associated retractor to lock.

In conventional inertial actuators, it is common for rim 30 to be the initial contact surface between locking lever 16 and ball mass 18, thus forming a ring contact line. In a condition where debris is present and interposed between ball mass 18 and locking lever 16, a contaminant particle of a given size causes a greater clockwise rotation of locking lever 16 as the interaction point between lever 16 and ball mass 18 moves closest to pivot axis 24. In other words, a contaminant interposed between ball mass 18 and the right-hand region of rim 30 designated as area 40 causes a greater angular displacement of the locking lever than the same contaminant interposed between the ball mass and the lever at point contact 32 in accordance with the present invention. By moving the contact area to near the vertical diametric plane 50 of ball mass 18, the tolerance to the presence of contaminants which may become lodged between the ball mass and lever 16 is enhanced. As mentioned previously, tolerance to the presence of contaminants is an important design objective of devices in accordance with the present invention. In addition to the debris tolerance, the inertial locking system 10 of the present invention allows a small "mismatch" between locking lever 16 and ball mass 18 to occur without lifting the lever and reducing the pawl gap (spacing between edge 28 and ratchet wheel teeth 14) to exist without causing the potential for an oversensitive retractor or locking too early.

When ball mass 18 moves to one of its displaced position as illustrated in phantom lines in FIG. 3, rim 30 engages the ball mass to aid in rotating locking lever 16 to the locking position. This may occur with any portion of rim 30, including displacement of the ball mass in the right-hand direction (as the components are shown in FIG. 3) to engage with rim 30 at area 40. However, in the normal position of ball mass 18 however, there is a separation between rim 30 and the surface of the ball mass.

Figure 4:
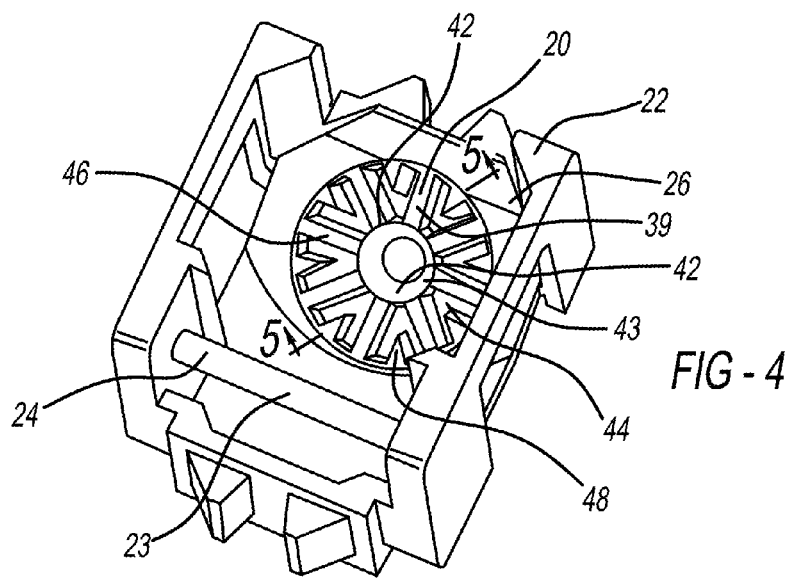
FIG. 4 is a pictorial view of the inertial locking actuator showing the locking lever and ball mass removed.
Figure 5:
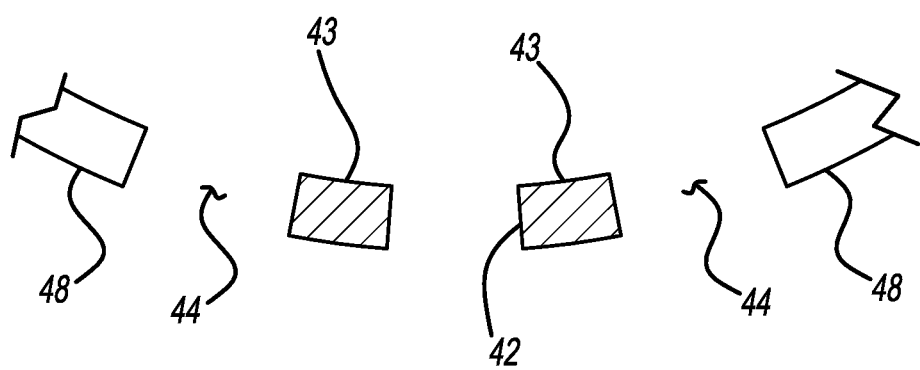
FIG. 5 is a cross-sectional view taken along line 5-5 of FIG. 4.

FIG. 4 illustrates additional features of locking sensor 10 which aid in providing two benefits; namely, contaminant tolerance and reduction of noise. Nest surface 39 forms a number of apertures including central aperture 42 formed by ring section 43 and V-shaped slots 44 which form a number of radially projecting ribs 46 extending from central aperture 42 to the outer perimeter of ball nest 20. The V-shaped slots 44 also define inwardly extending pointed extensions 48. V-shaped slots 44, ribs 46, and extensions 48 act to disrupt the transmission of vibrations caused by contact between ball mass 18 and surface of the ball nest 20, or the transmission of vibrations to the ball mass. These features tend to reduce the creation and transmission of noise upon such vibrations since they tend to reduce the presence of a continuous transmission path through housing 22 along nest 20 conducting vibrational movement which produces sound. The clear openings provided by V-slots 44 and central aperture 42 further provide an escape path for contaminants that may be present in the area of ball mass 18. This enables the contaminants to fall under the force of gravity past and underneath ball mass 38 where they will not interfere with operation of locking sensor 10.

While the above description constitutes the preferred embodiment of the present invention, it will be appreciated that the invention is susceptible to modification, variation and change without departing from the proper scope and fair meaning of the accompanying claims.

The invention claimed is:

1. A seat belt retractor inertial locking sensor for a seat belt retractor for locking the retractor through engagement of a spool lock in response to inertial forces acting on the retractor, comprising:
    a housing forming a ball nest surface, the ball nest surface defining a plurality of radially projecting ribs extending from a central aperture to an outer perimeter of the ball nest surface and further defining a plurality of V-shaped slots between adjacent ribs, each of the V-shaped slots having a pair of radially outward-extending legs having pointed extensions therebetween that point radially inwardly;
    a ball mass positioned on the nest surface and being displaceable on the nest surface from a normal position to a displaced position in response to inertial forces acting on the ball mass;
    a locking lever mounted for pivoting motion about a pivot axis, the locking lever having an engagement feature for engaging with the retractor spool lock, the pivot axis positioned relative to the center of gravity of the locking lever such that the locking lever is urged to pivot under the influence of gravity toward engagement of the locking lever with the ball mass with the retractor engagement feature out of engagement with the spool lock, wherein, upon certain inertial loads acting on the ball mass, the ball mass moves on the nest surface from the normal position to the displaced position contacting the locking lever and forcing the locking lever to move to a position of engagement with the spool lock; and
    the locking lever forming a point contact with the ball mass in the normal position along or adjacent to a vertical diametric plane of the ball mass, the locking lever further forming a circular rim which contacts the ball mass when the ball mass is in the displaced position to urge the locking lever to the position of engagement, the circular rim having a clearance with the ball mass in the normal position.

2. The locking sensor of claim 1 wherein the point contact is the sole contact between the ball mass and the locking lever when the ball mass is in the normal position.

3. The locking sensor of claim 1 wherein the pointed extensions are positioned between the ribs.

4. The locking sensor of claim 1, wherein the nest surface is generally concave.

5. The locking sensor of claim 1, wherein the pointed extensions are positioned between the ribs.

\* \* \* \* \*